R. K. LE BLOND & W. F. GROENE.
POSITIVE APRON DRIVE FOR LATHES.
APPLICATION FILED OCT. 14, 1915.

1,218,784.

Patented Mar. 13, 1917.

INVENTORS
Richard K. Le Blond
William F. Groene.
BY Rob't F. Harris.
ATTORNEY.

ated gear.

UNITED STATES PATENT OFFICE.

RICHARD K. LE BLOND AND WILLIAM F. GROENE, OF CINCINNATI, OHIO, ASSIGNORS TO R. K. LE BLOND MACHINE TOOL COMPANY, OF CINCINNATI, OHIO, A CORPORATION OF OHIO.

POSITIVE APRON-DRIVE FOR LATHES.

1,218,784. Specification of Letters Patent. Patented Mar. 13, 1917.

Application filed October 14, 1915. Serial No. 55,882.

*To all whom it may concern:*

Be it known that we, RICHARD K. LE BLOND and WILLIAM F. GROENE, citizens of the United States, residing at Cincinnati, county of Hamilton, and State of Ohio, have invented an Improvement in Positive Apron-Drives for Lathes, of which the following description, in connection with the accompanying drawings, is a specification, like letters on the drawings representing like parts.

The invention to be hereinafter described relates to machine tools, such as lathes and the like, and more particularly to apron feed mechanisms employed therein for giving to the carriage its proper feed movements.

In machines of this general character it has been proposed heretofore to provide an apron feed mechanism for imparting to the tool either its cross or lengthwise feed movements. Inasmuch as the feed movements of the carriage are liable to interruption from time to time or are to be adapted for different characters of work, it has heretofore been proposed to include in the apron feed mechanisms of such machines, a friction clutch and manually controlled means therefor, and such friction clutch has been found to be practically efficient in many kinds of work and it enables the carriage movements to be interrupted when desired and to be started again at the stopping point. A good practical form of such apron feed mechanism is shown in the prior patent granted to Le Blond and Groene, No. 980,971, January 10, 1911.

Where an apron feed mechanism includes in its construction a friction clutch, there is a possibility at times and under certain conditions of work, that the clutch will slip and when the clutch members are disengaged, there is liability of the friction members creeping together or "winding up," as it is termed, and starting the feed. These actions of an apron feed provided with a friction clutch mechanism are well understood, and recognized in the art, but owing to the facility with which the carriage feed may be stopped and started at the same point, such friction clutch means are generally employed.

In its broadest aspect, the present invention contemplates an apron feed provided with a driving member and a driven member and positive clutch connections, whereby said members may be placed in positive driving relation or disengaged from such position. In carrying this feature of the invention into practical effect, an apron feed mechanism of the general type of that shown and described in our prior Patent No. 980,971 is illustrated, wherein the tool may be given either cross or lengthwise feed movements, but it is to be understood, of course, that the invention is not restricted to this particular type of apron feed, and may be used effectively in other forms of apron feed mechanisms.

In another aspect, an important feature of the present invention consists in forming the driving and driven members of the positive clutch of large diameters and providing them with a multiplicity of fine teeth to secure quick and satisfactory engagement. To this end the gear deriving its motion from the feed rod of the lathe may be provided with a flange of large diameter having fine teeth extending therefrom, or such fine teeth may, of course, be secured to said gear; and the driven member of the clutch may be provided in similar manner with a corresponding series of fine teeth. Motion from the driven member of the clutch may be transmitted to the feed elements in any suitable manner, and as a good form of means to this end, the driven member may have operatively connected to it, a gear from which a transmission train may be actuated. The present invention also provides means for positively effecting the engagement and disengagement of the driving and driven members of the apron feed to effect either cross or longitudinal feed movements. Such relative movements of the two clutch members to engage or disengage the fine teeth thereof may be variously effected, but a good practical form of the invention in this respect consists in manual means for moving the driven member to carry its large circle of fine teeth into engagement with the corresponding circle of fine teeth of the driving member. In the form of the invention illustrated, the driven member of the clutch is conveniently shown as formed on or connected to the hub of an elongated gear and clutch engaging and disengaging movements are effected in such illustrated form of the invention by movement of the elongated gear and driven member, but it will be understood that while this combination of elements is well adapted to the end desired, the essential in this respect is that the driven member having the large circle of fine teeth be movable into and out of engaging relation with the driving member and be operatively connected in any suitable manner with a gear for actuating the train of feed elements.

To appropriately move the large circle of fine teeth of the two clutch members for quick and positive engagement or disengagement, manual means may be employed suitable to the purpose, but as shown in the illustrated form of the invention, such manual means consists of a rack and pinion arrangement, though obviously, this is not essential and may be variously modified.

These and various other features of the present invention will be hereinafter more fully described in connection with the accompanying drawings showing one good, practical form of carrying the invention into effect.

In the drawings:—

Figure 1:
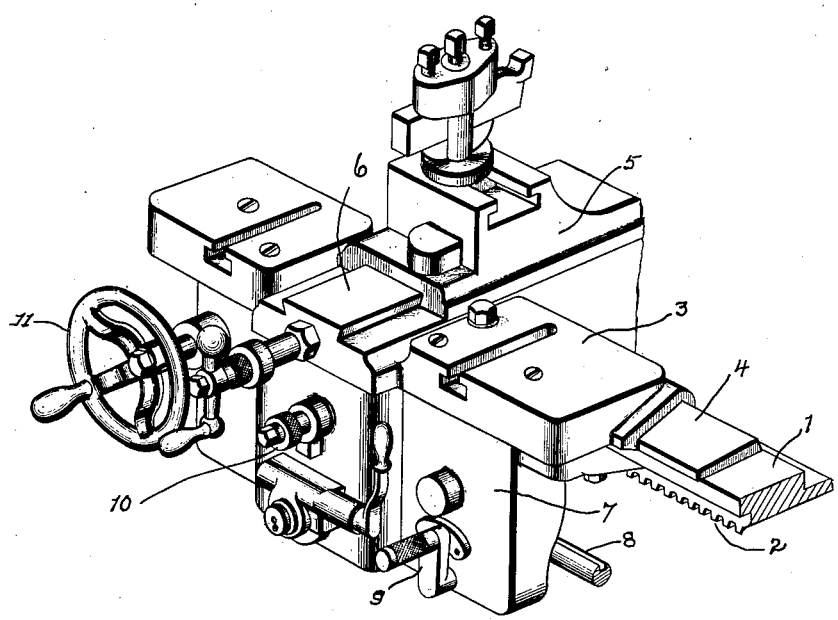
Figure 1 is a perspective view showing portions of a lathe frame, the carriage movable longitudinally or lengthwise thereof, and the tool carrier mounted on the carriage for cross feed or adjusting movements, some of the parts being broken away and others being shown in section to disclose more fully the relation of parts.

The machine frame may be of any usual type, and in the illustration of the invention herein, only the top portion 1 of the frame is illustrated, having provided on its under portion the rack teeth 2 which are adapted to engage suitable gear or pinion mechanism for effecting the lengthwise feed of the carriage, as usual in this type of machine, and as more fully exemplified in the patent hereinbefore called to attention.

Mounted upon the frame 1 is the carriage which, as a whole, is indicated at 3. The carriage 3 is mounted for longitudinal movement on the ways 4 of the frame, and is provided with a tool carrier 5 which is movable transversely of the carriage upon the dovetailed guide 6. These parts may be substantially as fully exemplified in the patent hereinbefore called to attention.

Extending downward from the carriage 3 is the apron 7 for supporting the feed mechanism which may comprise the feed rod 8 and its associated bevel gears rotatable therewith, as fully described in the said prior patent. In order to change the direction of feed of the carriage 3, a handle 9, as in said prior patent, is provided for shifting the position of the bevel gears, as will be readily understood. Likewise, as fully described in said prior patent, the apron 7 is provided with the shifter 10 for changing from cross to lengthwise feeds and vice versa, and a hand-wheel 11 may be provided for moving the carriage lengthwise of the machine by hand. These features are not herein especially described in detail, because they form no essential part of the present invention and may be and preferably are substantially as fully shown and described in the prior patent mentioned, and to which reference may be had, though they may be otherwise contrived.

Rotatably mounted upon the apron 7 is the gear 12, which, for identification hereinafter will be designated the "driving member". The driving member is provided with the bevel teeth 13 which, as in said prior patent, are adapted to engage with or disengage from the usual bevel gears for giving to such driving member its driving movements. The driving member is provided with the hub portion 14 and is held from bodily movement longitudinally of its axis by the shoulders 15 and 16, the latter of which is engaged by a head 17 secured to the hub 14 of the driving member by any appropriate means, the construction being such that while the driving member may be continuously rotated as pointed out in the said prior patent, it is held from movement longitudinally of its axis.

Extending from the driving member is a flange 18 provided with the teeth 19 which are adapted to engage the teeth 20 formed in a disk 21 constituting, in the present form of the invention, the driven member. The teeth engaging portions of the driving and driven members are made of large diameter, and the teeth are sufficiently fine to permit positive engagement of the driving and driven members substantially in any position to which they may be relatively rotated. Obviously, the greater the number of engaging teeth on the driving and driven members, or in other words, the greater the fineness of these teeth, the more nearly will they adapt themselves to positive engagement regardless of the rotative position of the driving and driven members.

Figures 2, 3:
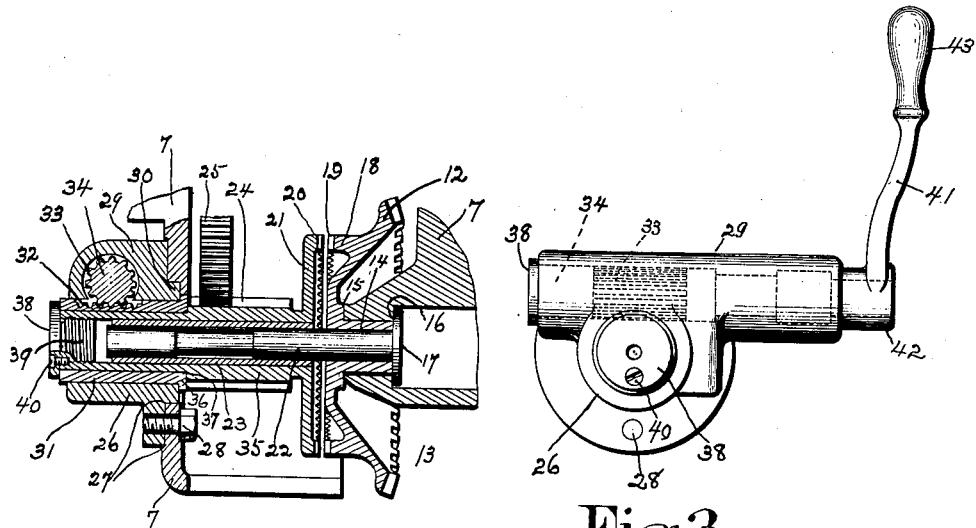
Fig. 2 is an enlarged sectional detail showing the driving and driven positive engaging members and the means for effecting their engagement and disengagement.
Fig. 3 is a view in front elevation of the bracket and its associated devices for effecting engagement and disengagement of the driving and driven members.

Extending from the head 17 is a stud or shaft 22, Fig. 2, carrying a sleeve 23 on which is mounted the elongated transmitting gear 24, the teeth of which are adapted to be engaged by the feed wheel 25, the construction being such that regardless of the direction of rotation of the elongated transmitting gear 24, the feed wheel 25 will be suitably rotated and as pointed out in the patent hereinbefore mentioned, such rotative movement will effect either the cross feed of the tool or longitudinal feed of the carriage. Secured to the apron 7, preferably at the exterior portion thereof, is a bracket 26, and in order that said bracket may be effectively connected to the apron, the latter is provided with shoulders 27 on which the lower portion of the bracket 26 rests and a clamp or bolt 28 ties the bracket and apron in associated relation. The bracket 26 has an upper portion 29 which is likewise provided with a portion 30 to engage the apron and assist in maintaining the bracket in proper position.

Extending through the bracket 26 is a bush 31 having a series of teeth 32 which are engaged by the teeth 33 formed on or secured to an operating shaft 34 extending longitudinally through the upper portion 29 of the bracket 26, the construction being such that upon rotative movement being imparted to the operating shaft 34, the bush 31 will be appropriately moved longitudinally or in a direction transversely of the machine frame.

It is the purpose of the present invention that movement of the bush 31 shall control the engagement and disengagement of the driving and driven members of the positive clutch, and to this end the driven member 21 of the positive clutch is formed as a disk which may be part of or secured to the extended hub portion 35 of the elongated pinion 24. In the present form of the invention, the driven member 21 is shown as integral with the hub of the elongated pinion, but of course such integral formation is not necessary.

The bush 31 engages the elongated hub 35 of the pinion 24 and by movement of such bush the said pinion, and perforce, the driven member 21 of the clutch, is given its engaging and disengaging movements.

As one form of means for thus associating the bush 31 and the elongated pinion 24, the end portion 36 of the bush is engaged with a shoulder 37 formed in the hub of the elongated pinion and to the opposite end of the hub of the elongated pinion 24 is secured a stop 38, the edge portions of which overlie the outer end of the bush 31, the construction being such that longitudinal movement of the bush 31 in the bracket 26 will cause corresponding longitudinal movement of the elongated pinion and consequently of the clutch member.

As one convenient form of the invention in this respect, the stop 38 may be formed as a head having a threaded portion 39 for engaging an interior screw-thread formed in the hub of the elongated pinion 24, and to prevent accidental turning movement of the screw 39, a lock screw 40 may be employed, the construction being such that when the parts are assembled as indicated in Fig. 2, with the bush 31 disposed between the shoulder 37 and the stop 38, any longitudinal movement of the bush imparted thereto through the shaft 34 will be transmitted to the elongated pinion 24 and effect either engagement or disengagement of the positive clutch engaging members as will be readily understood.

The operating shaft 34 may be manually controlled by suitable means, but inasmuch as when the clutch members are in positive engaging relation or have been disengaged, they should be maintained in the established relation, the present invention contemplates providing manual means of a character that when the clutch members are in engaging relation, they will be held in this relation, and conversely, when they are in disengaged relation, they will be held in this position. In the present form of the invention, the shaft 34 has secured thereto, a handle 41, the hub 42 of which is connected to the end of the shaft 34 and the operating end portion of the handle 41 is provided with a weighted or enlarged portion 43, said parts being constructed and arranged so that when the clutch members are thrown into engaging relation, the handle 41 will be to the left of the vertical plane passing through the shaft 34, Fig. 2, and consequently move the clutch members in engaging relation; and, when the shaft is rocked to withdraw the clutch members from engaging relation, the handle 41 will be at the right of said vertical plane, thereby tending to hold the clutch members in the described relation.

From the construction described, it will be noted that when the driving member and the driven member are moved into operative relation, they are positively clutched and all possibility of slipping of one member upon the other and consequent imperfect carriage feed is prevented. Likewise, when the driving and driven members are disengaged, there is no liability of their accidental reengagement and consequent starting up the feed.

Obviously changes may be made in some of the details of the invention without departing from the true scope thereof as defined by the claims, but the described construction has been found to be a practical and efficient embodiment thereof. For instance, instead of securing the driven member of the clutch for movement with an elongated transmission gear, the two parts may be otherwise related, the essentials in this respect being that the members of the clutch be relatively movable to quickly and positively engage and disengage the large circle of fine clutch teeth on each, and that the driven may, when clutched to the driving member, transmit its rotation to a gear for transmission to the feed element. Likewise, while the bush with its rack teeth and operating pinion constitute a good practical form of means for relatively moving the clutch members, yet other manual means may be employed, or the rack teeth and pinion be modified to suit the conditions of use.

What is claimed is:—

1. In an apron feed for machine tools, the combination of a carriage, a driving and a driven member mounted for movement with the carriage, a series of fine teeth extending from the driving member, a series of fine teeth extending from the driven member, a gear connected to the driven member, a feed wheel engaging said gear, means for relatively moving said driving and driven members to positively engage and disengage the fine teeth of said members, a handle at the exterior of the apron for operating said means to effect positive engagement of the driving and driven members, and means for holding the parts in such position.

2. In an apron feed for machine tools, the combination of a carriage, a gear having operatively connected therewith a large circular series of fine teeth constituting one member of an apron feed clutch, a driving gear having a corresponding circular series of fine teeth constituting the other member of the apron feed clutch, means for holding the driving gear from movement longitudinally of its axis, means for relatively moving the circular series of fine teeth toward and from each other to effect positive engagement and disengagement of the members of the apron feed clutch, a handle at the exterior of the apron for operating said means and movable to either side of a vertical plane for locking the said members in operative or in inoperative relation.

3. A positive apron feed for machine tools, comprising, in combination, a driving member having a multiplicity of fine clutch teeth arranged in circular series, a driven member having a corresponding multiplicity of fine clutch teeth arranged in circular series, a gear operatively connected to said driven member, and manual means at the exterior of the apron for moving the two circular series of fine teeth to effect positive engagement and disengagement of said driving and driven member.

4. A positive apron feed for machine tools, comprising, in combination, a driving member having a multiplicity of fine clutch teeth, a driven member having a corresponding multiplicity of fine clutch teeth, a gear connected to said driven member, a toothed device operatively connected to said driven member, means at the exterior of the apron for moving the toothed device to effect positive engagement and disengagement of the teeth of said driving and driven members, and means for holding the toothed device in position with the clutch teeth engaged or disengaged.

5. In a positive apron feed for machine tools, the combination of a feed rod, a positive clutch member operated by said feed rod, a second positive clutch member, a transmission gear connected to the driven clutch member to rotate therewith, and a clutch actuator comprising a longitudinally movable member having rack teeth, a rotatable toothed member for moving the longitudinally movable member lengthwise, and a handle exterior of the apron for rotating the rotatable toothed member to cause lengthwise movement of the longitudinally movable member and effect positive engagement or disengagement of the positive clutch members.

6. A positive apron feed for machine tools, comprising, in combination, a bracket secured to the apron and projecting outwardly therefrom, a bush longitudinally movable in said bracket and having a series of rack teeth arranged longitudinally of the bush, a pinion connected to said bush for longitudinal movement therewith and carrying a disk provided with a series of clutch teeth, a driving member having a series of clutch teeth, a shaft carried by the bracket and extending transversely of the bush, a tooth member carried by the shaft and engaging the rack teeth of the bush, and a handle exterior of the apron for rotating the toothed member to move the bush longitudinally.

7. A positive apron feed for machine tools, comprising, in combination, the apron, a bracket secured to the apron, a bush provided with rack teeth and movable longitudinally in said bracket, a shaft having teeth for moving the bush longitudinally, a pinion having a hub portion connected for longitudinal movement with and rotative movement relative to said bush, a driven clutch member connected to said pinion and provided with clutch teeth, a driving clutch member provided with teeth for positively engaging the teeth of the driven clutch member, and means at the exterior of the apron for rotating the said shaft.

8. In a machine of the character described, the combination of a feed apron, a bracket secured thereto, a bush longitudinally movable in said bracket and provided with a series of rack teeth arranged longitudinally thereof, positive clutch members controlled by longitudinal movement of the bush, a cross shaft mounted in said bracket crosswise of the bush and carrying a pinion for engaging the rack teeth of the bush, and a handle secured to said cross-shaft and extending upward therefrom for operating the pinion, said handle comprising a weight movable to either side of the vertical plane passing longitudinally through the said cross-shaft for holding the clutch members in operative or inoperative relation.

9. An apron feed for machine tools, comprising, in combination, a driving clutch member, a driven clutch member, said members being provided with teeth adapted for interlocking engagement to effect positive drive of the driven member, an apron having a bracket secured thereto and provided with an opening extending in a direction transversely of the apron, a bush mounted for longitudinal movement in said opening and having rack teeth, a hub connected to one of the said clutch members and engaging said bush for rotative movement relative thereto and longitudinal movement therewith, an operating shaft extending transversely of said bush and provided with teeth for engagement with said rack teeth of the bush, and means on the exterior of the apron for rocking said shaft.

In testimony whereof, we have signed our names to this specification, in the presence of two subscribing witnesses.

RICHD. K. LE BLOND.
WILLIAM F. GROENE.

Witnesses:
FRED LE BLOND,
JOHN A. LE BLOND.